United States Patent
DiPrima et al.

(10) Patent No.: US 7,463,889 B1
(45) Date of Patent: Dec. 9, 2008

(54) INTELLIGENT CUSTOMER CARE SUPPORT USING NETWORK CAMEL SUBSCRIPTION INFORMATION

(75) Inventors: Kenneth James DiPrima, Roswell, GA (US); John Thomas Hursey, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 75 days.

(21) Appl. No.: 11/200,743

(22) Filed: Aug. 10, 2005

(51) Int. Cl.
*H04Q 7/20* (2006.01)
(52) U.S. Cl. .................. 455/445; 455/414.1; 455/432.1
(58) Field of Classification Search .................. None
See application file for complete search history.

(56) References Cited

U.S. PATENT DOCUMENTS

| | | | |
|---|---|---|---|
| 5,867,570 | A | 2/1999 | Bargout et al. |
| 6,122,510 | A | 9/2000 | Granberg |
| 6,240,284 | B1 | 5/2001 | Bugnon et al. |
| 6,434,126 | B1 | 8/2002 | Park |
| 6,671,523 | B1 | 12/2003 | Niepel et al. |
| 6,904,035 | B2 | 6/2005 | Requena |
| 6,987,969 | B1 * | 1/2006 | Brunig et al. ............... 455/433 |
| 7,050,811 | B2 | 5/2006 | Grech et al. |
| 2002/0193100 | A1 * | 12/2002 | Riffe et al. .................. 455/417 |
| 2004/0063423 | A1 | 4/2004 | Kagay, Jr. |
| 2004/0103191 | A1 | 5/2004 | Larsson |
| 2005/0164707 | A1 | 7/2005 | Batni et al. |
| 2006/0240820 | A1 * | 10/2006 | Jiang ....................... 455/432.1 |
| 2006/0240822 | A1 * | 10/2006 | Jiang ....................... 455/433 |

OTHER PUBLICATIONS

Crowe, David, "Thirsty for new features? Get a CAMEL?", Cellular Networking Perspectives, David Crowe's Wireless Review Magazine Articles Protocols Section: Mar. 2001, 5 pages, retrieved Nov. 17, 2004 from URL: http://www.cnp-wireless.com/ArticleArchive/Wireless%20Review/200103%20CAMEL.html.

(Continued)

*Primary Examiner*—Erika A Gary
(74) *Attorney, Agent, or Firm*—Zagorin O'Brien Graham LLP

(57) ABSTRACT

A mobile communications system stores an address of an external control component and a service indicator indicating a service to be performed by the external control component. The service indicator and address of the external control component may be Network CAMEL Subscription Information (N-CSI) stored by the switching center. In response to detecting a customer care call from a mobile communications device, the switching center suspends call processing and queries the external control component utilizing the stored address. The external control component performs the service indicated by the service indicator and determines how to continue processing the customer care call in accordance therewith. The service performed by the external control component determines a translation for the customer care call and the external control component returns information to the switching center for routing the call according to the translation. In an embodiment the translation is determined at least in part according to an International Mobile Subscriber Identifier (IMSI) associated with the mobile communications device. The translation may also be determined, at least in part, according to one or more of time of day, day of week, and location of the switching center.

20 Claims, 5 Drawing Sheets

OTHER PUBLICATIONS

Kislak, Ali, "'CAMEL,' 'Customised Applications for Mobile network Enhanced Logic,'" CAMEL & IN, Demo Version 1.0, Jan. 19, 2002, 18 pages, retrieved Nov. 17, 2004 from URL: http://www.hotel-fiesta.com/4g-aliweb/MyDOCS/CAMELMExEin/CAMELin.htm.

Meskauskas, Paulius, "Customised Applications for Mobile Enhanced Logic (CAMEL)," Research Seminar on Nomadic Computing, University of Helsinki, 1999, 13 pages.

Final Office Action mailed Feb. 7, 2008 in U.S. Appl. No. 11/072,035, 17 pages.

Final Office Action mailed Mar. 22, 2007 in U.S. Appl. No. 11/072,035, 17 pages.

Non-Final Office Action mailed Sep. 19, 2007 in U.S. Appl. No. 11/072,035, 16 pages.

Non-Final Office Action mailed Oct. 6, 2006 in U.S. Appl. No. 11/072,035, 15 pages.

Non-Final Office Action mailed Jan. 2, 2008 in U.S. Appl. No. 11/200,936, 14 pages.

Non-Final Office Action mailed Aug. 16, 2007 in U.S. Appl. No. 11/200,936, 13 pages.

* cited by examiner

INTELLIGENT CUSTOMER CARE SUPPORT USING NETWORK CAMEL SUBSCRIPTION INFORMATION

BACKGROUND OF THE INVENTION

1. Field of the Invention

This invention relates to the field of mobile telecommunications, and more particularly, to utilization of customer care numbers.

2. Description of the Related Art

In typical current 611 customer care implementations, when a customer dials 611 for customer care, 611 routing is performed by the serving mobile switching center (MSC). The MSC translates the 611 call to a number that routes the call to the appropriate Customer Care Center. The MSC utilizes customer specific information such as the International Mobile Subscriber Identifier (IMSI), to make the translations.

Referring to FIG. 1, in one conventional approach each of the MSCs 107 in a carrier's network 100 maintains a table with all home customer care numbers. The customer care numbers are typically associated with a subscriber based on the Mobile Country Code (MCC) and Mobile Network Code (MNC) within the International Mobile Subscriber Identifier (IMSI). When the MSC receives a 611 call, the MSC analyzes the call and determines the appropriate home customer care number for the particular call based on the MCC/MNC. However, that approach requires the provisioning of hundreds of MSCs, and it becomes difficult to update or change the home customer care information in each MSC. For example, if there is a change to 611 number translation, all the MSCs in the carrier's network have to be provisioned to reflect the change. Further, it is not easy to provide additional customer care capability such as customer care routing based on criteria such as time of day, location, day of the week, etc.

In addition, because the translations of the customer care calls are based on the subscriber's IMSI, typically the MCC/MNC, the MSC is unable to distinguish between subscribers of a carrier and subscribers of a reseller, who resells carrier services to reseller subscribers. Thus, in situations where a carrier sells cellular service to a reseller, and the MCC/MNC of the reseller's subscribers is the same as the carriers, it is impossible to route reseller's subscribers to their own customer care number(s) via 611. Instead, resellers use their own 800 numbers for customer care. In addition, because the translations are done in the MSC, unless the serving MSC is in the carrier's own network or the carrier operating the serving MSC has an agreement in place with the visited MSC, 611 calls will not be recognized as a customer care number when a subscriber is roaming in another carrier's network.

Accordingly, it would be desirable to have more versatile customer care capability.

SUMMARY OF THE INVENTION

In an embodiment, a mobile communications system is provided that stores in a storage associated with a switching center an address of an external control component and a service indicator indicating a service to be performed by the external control component. The address and the service indicator are associated with the switching center and not the mobile communications device. In response to detecting a customer care call from a mobile communications device in the switching center according to a sequence of dialed digits of the customer care number, the switching center suspends call processing and queries the external control component utilizing the stored address. The external control component performs the service indicated by the service indicator and determines how to continue processing the customer care call in accordance therewith. The external control component communicates call control information to the switching center regarding how to continue call processing. The service performed by the external control component determines a translation for the customer care call and the external control component returns information to the switching center for routing the call according to the translation. In an embodiment the translation is determined at least in part according to an International Mobile Subscriber Identifier (IMSI) associated with the mobile communications device. The translation may also be determined, at least in part, according to one or more of time of day, day of week, and subscriber location and the service indicator (or service key). In an embodiment, the service indicator and address of the external control component are Network CAMEL Subscription Information (N-CSI) stored by the switching center.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF EXEMPLARY EMBODIMENTS

Figure 1:
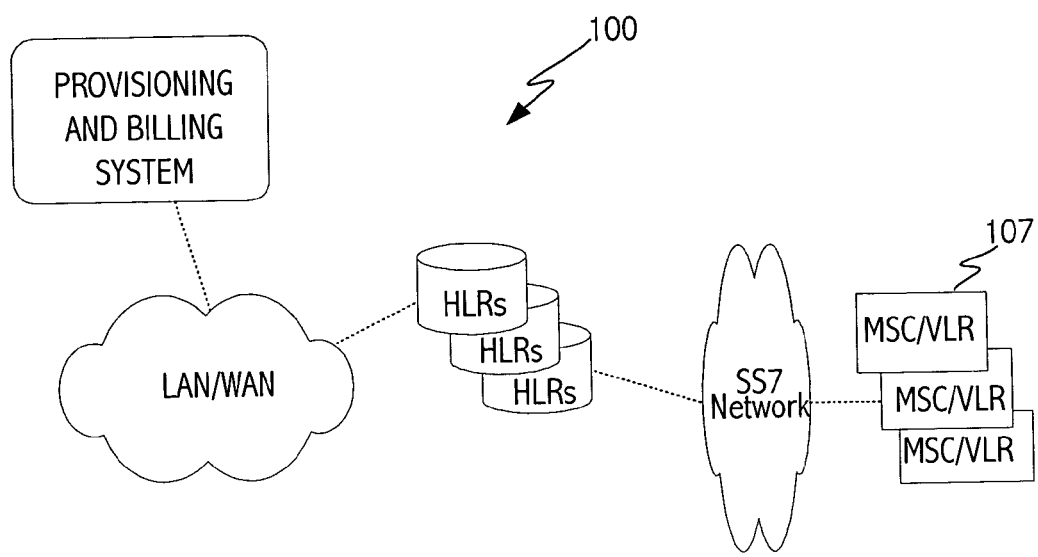
FIG. 1 illustrates an exemplary mobile communications network.

According to one embodiment, the network operator or service provider configures the system to offer Customer Care routing translations based on a variety of factors, such as location, time of day and/or day of week, and other factors associated with a subscriber (e.g., status as a subscriber of a reseller). Utilizing Intelligent Network (IN) functionality in GSM, Customized Applications for Mobile Enhanced Logic (CAMEL), to provide the Customer Care capability described herein allows the network operator to provide a universal Customer Care service solution across all vendor types even when the subscriber is roaming outside the network (for carriers that support intelligent network functionality, e.g., CAMEL Phase 3).

One customer care number i.e., the 611 translation, may be associated with one group of subscribers and another customer care number with another group. For example, the appropriate customer care number may be determined, in part, according to the cellular equipment utilized by the subscriber, or for other reasons. When a particular customer care number is to be assigned to a subscriber's number, the Dialed CAMEL Subscription Information (D-CSI) in the subscriber's profile is updated in the HLR via a provisioning system. That information contains the Service Key to be used to identify the service performed by the SCP, the SCP Address of the platform that hosts the IN logic for Customer Care service and the various Trigger Detection Points that define the Points in the Call where processing is diverted to the Service Control Point (SCP). The Service Key is a number or other identifier that identifies the service to be performed by the SCP. The service performed by the SCP determines a number to dial or other call option, the number typically being a customer care number, to which the call is connected. Thus, the appropriate customer care number is determined, at least in part, based on the service that is executed as determined by the Service Key. Different Service Keys may correspond to different customer care numbers. For example, a subscriber of a reseller of wireless services can have a different Service Key and customer care number than a subscriber of another wireless service provider.

Anytime the subscriber dials 611, the MSC recognizes the dialed string 611 and suspends processing and invokes the IN logic that resides on the IN Platform (SCP). The IN platform contains the logic necessary to reroute the call to the appropriate Customer Care number. The appropriate Customer Care number may be based on such criteria as Service Key (IN service indicator), time of day, serving MSC (location based routing).

Using an IN solution eliminates limitations of the number of Customer Care Centers that can be used. For example, resellers of a particular carrier's services will be able to reroute calls to Customer Care Centers that are for the reseller's customers. In addition, provisioning and maintenance is greatly reduced. The Customer Care numbers only need to be defined on the SCP. Any changes to these numbers do not effect the subscription information stored on the HLR. Thus, this approach provides savings in terms of reduced effort to maintain the customer care numbers. In addition there are reduced costs of supporting calls directed to the "wrong" Customer Care Center.

Figure 2:
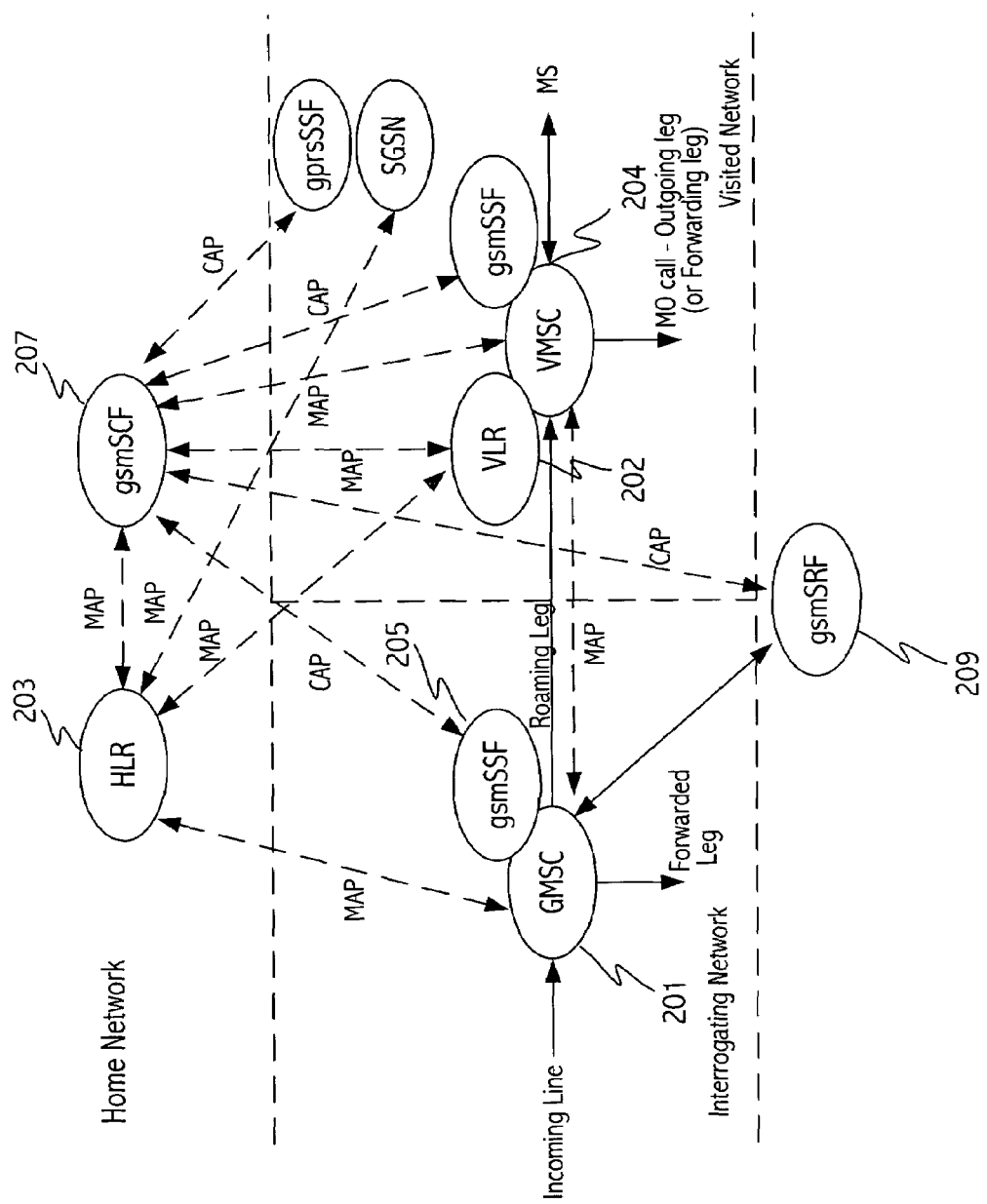
FIG. 2 illustrates an exemplary functional network architecture showing the entities involved in calls requiring CAMEL support.

An exemplary functional network architecture showing the entities involved in calls requiring CAMEL support is depicted in FIG. 2. That network architecture can be used to provide Customer Care flexibility as well as other services in a carriers's network. The service logic for CAMEL Customer Care typically resides on the gsmSCF, the element that performs the service control function within the SCP.

For subscribers requiring CAMEL support, the HLR 203 stores the information relevant to the current subscription. For Customer Care this includes Dialed CAMEL Subscription Information (D-CSI). The D-CSI is sent to the VLR 202 at Location Update, on data restoration or if the D-CSI is updated by administrative action. The D-CSI is sent to the GMSC when the HLR responds to a request for routing information.

In one embodiment the billing and provisioning system is used to update the Dialed CAMEL Subscription Information (D-CSI) in the HLR. Provisioning of the selection criteria and the Custom Care numbers is done on the IN Platform.

In one embodiment, when a subscriber is appropriately provisioned for 611, the subscriber profile is updated such that the IN logic for Customer Care will be invoked anytime the subscriber dials 611. This is accomplished by defining the SCP Address for the dialed string 611.

Referring to FIG. 2, when processing the calls for subscribers requiring CAMEL support, the Dialed CAMEL Service Information (D-CSI) is sent from the HLR to the VLR at Location Update, on data restoration, or if the D-CSI is updated by administrative action. GSM Service Switching (gsmSSF) is the network entity that interfaces the MSC/GMSC to the gsmSCF. GSM Service Control Function (gsmSCF) 207 is the network entity that contains the CAMEL service logic to implement CAMEL services. The gsmSCF 207 interfaces with the gsmSSF 205, the gsmSRF 209 and the HLR 203. The GMSC monitors on request the call states (events) and informs the gsmSSF of these states during processing, enabling the gsmSSF to control the execution of the call in the GMSC. For subscribers dialing 611 this will include sending a request (InitialDP) to the SCP whenever the dialed digits 611 are encountered.

The GSM Specialized Resource Function (gsmSRF) 209 is the network entity which provides various specialized resources, such as announcements. GsmSRF 209 interfaces with the gsmSCF 207 and with the GMSC 201. This gsmSRF entity is defined in ITU-T Recommendation Q.1224 [30] with variations defined in the specification.

The VLR stores the D-CSI as a part of the subscriber data for subscribers roaming in the VLR area. When processing the calls for subscribers requiring CAMEL support, the VMSC 204 receives the D-CSI from the VLR indicating the MSC shall request instructions from the gsmSSF. For subscribers dialing 611 this will include sending a request (InitialDP) to the SCP whenever the dialed string is encountered.

CAMEL Phase 3 or higher capability may be utilized to implement various embodiments of the Customer Care capabilities described herein.

In one embodiment, the following messages are utilized to support Customer Care The InitialDP (gsmSSF→gsmSCF) is sent for originating calls. The operation is sent by the gsmSSF to the gsmSCF after a DP3 trigger event occurs, i.e., detection of the dialed string 611 for an originating call. The Service Key and possibly other optional criteria is used to determine the appropriate customer care number. The connect operation (gsmSCF→gsmSSF) is used to request that the SSF perform the call processing actions to route the call to the appropriate Customer Care Center. The DestinationRoutingAddress contains the translated number. The Continue operation (gsmSCF→gsmSSF) is used to request that the gsmSSF proceed to the next point in the Basic Call State Model (BCSM) and can be used as the default operation if no translation is found for the customer care number. Thus, a translation available in the switch may be used to continue the call. It certain circumstances an announcement may be used where, e.g., no translation can be found for a customer care call. The Release-Call operation (gsmSCF→gsmSSF) is used to tear down an existing call. ReleaseCall implicitly cancels outstanding BCSM event reports. It may be used to terminate a call if a critical error has occurred.

The service logic in the SCP allows the announcement to be configurable based on Service Key and Serving MSC and other criteria. The service logic is typically implemented as software, but may include both hardware and software components. Exemplary CAMEL messages that may be used to support functionality described herein include EstablishTemporaryConnection, DisconnectForwardConnection, PlayAnnouncement, ConnectToResource, AssistRequestInstructions, and Specialized Resource Report (SRR).

In certain embodiments a subscriber can roam in networks that support CAMEL Phase 3 and reach an appropriate customer care number.

Figure 3:
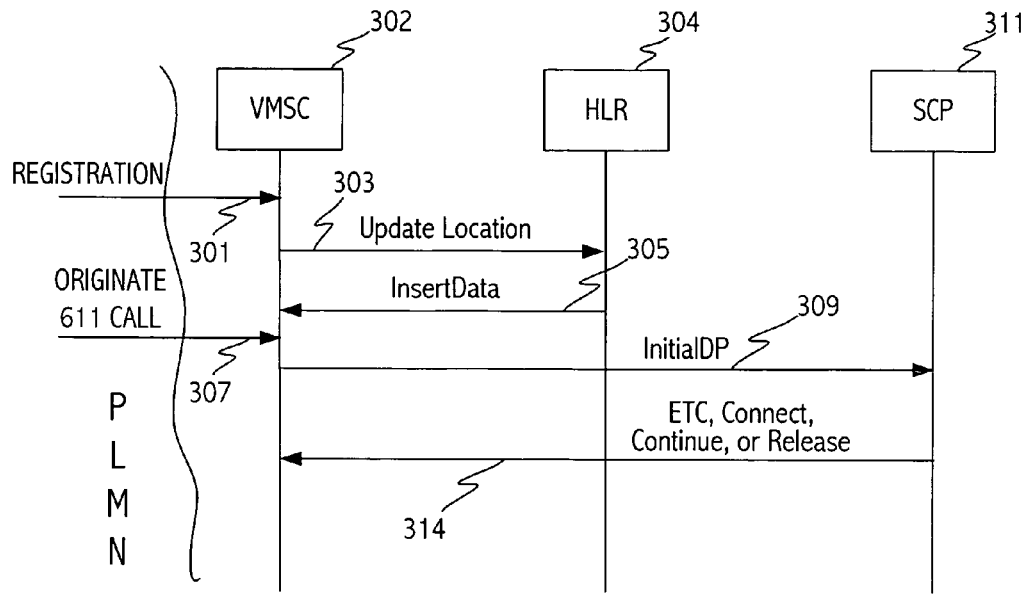
FIG. 3 illustrates exemplary 611 call scenarios according to an embodiment of the invention.

Referring to FIG. 3, a 611 call scenario from a subscriber is illustrated. At 301, in response to, e.g., a mobile station being turned on, the mobile station registers with the VMSC 302. In response to the registration, the VMSC 302 sends an Update Location message 303 to HLR 304. The HLR returns an InsertData message 305 that includes the D-CSI. The D-CSI indicates that a trigger (DP3) is armed. The D-CSI also defines the SCP Address and Service Key associated with the DP3 trigger. The trigger is a result of a special condition being recognized during call handling by the VMSC. Recognition of the condition 'triggers' a query to the external control component (the SCP). This recognition takes place at predefined Detection Points (DP) in the call handling. The DP3 trigger, is caused when the dialed digits are analyzed and meet the criteria established for the trigger, here the dialed digits being a 611 call.

When the mobile station originates a call at 307, the switching center VMSC 302 detects the DP3 trigger for this call, and sends an InitialDP message 309 to SCP 311. The SCP 311 can respond to the InitialDP message based on such factors as the Service Key, NPA-Nxx, time of day, day of week, location, and IMSI. In one scenario, the SCP determines through service logic utilizing one or more of those factors, and/or additional factors, which Customer Care number (e.g., an 800 number for a reseller subscriber) should be used for the call. The service logic may use a best match scenario using a hierarchical structure and pattern matching based on criteria described above. That Customer Care number may be returned in the DestinationRoutingAddress of the Connect operation 314. Alternatively, an Establish Temporary Connection (ETC) message may be sent from the SCP to the VMSC. The ETC operation can be used to provide operator specific announcements to the calling party. It cannot necessarily be used while inter-carrier roaming.

Rather than respond with the Connect or ETC, in other scenarios, a Release operation 314 is returned and the call is terminated, when, e.g., the SCP does not find a translation in the table to match the Service Key and NPA-Nxx, or IMSI. A Continue operation may also be used where no translation is found.

Figure 4:
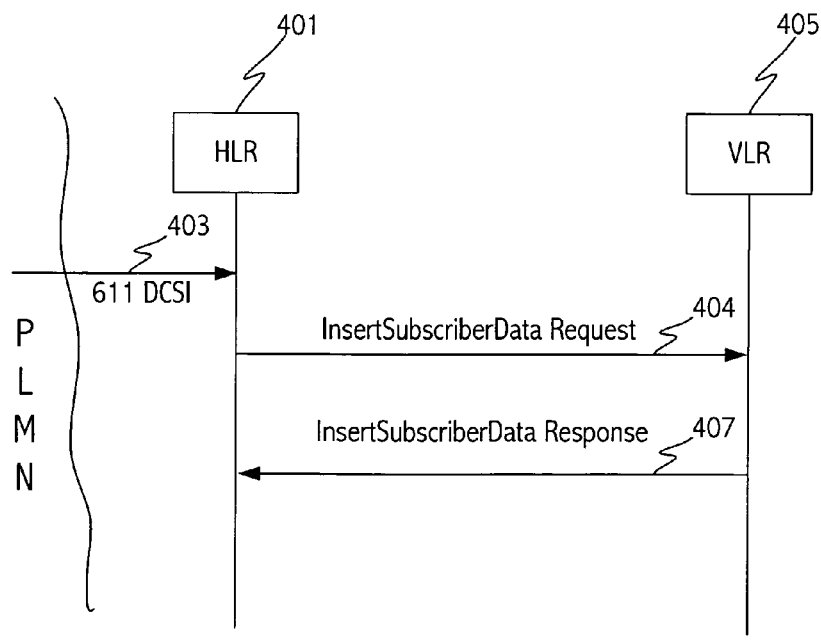
FIG. 4 illustrates an operation in which 611 information related to a subscriber is updated.

Referring to FIG. 4 illustrated is an operation in which 611 information related to the subscriber is updated. The billing/provisioning system communicates the 611 information to HLR 401 at 403. The process includes saving the current settings for the D-CSI, assigning the SCP Address for DP3 in the D-CSI, setting Service Key in the D-CSI to the appropriate value and updating the subscriber's profile in the HLR 401. The Service Key reflects the Customer Care service that should be run for the particular subscriber. If the subscriber is roaming, an InsertSubscriberData Request operation 404 is sent to the VLR 405 to update the subscriber information. An InsertSubscriberData Response operation 407 is returned to indicate that the update was successful.

Figure 5:
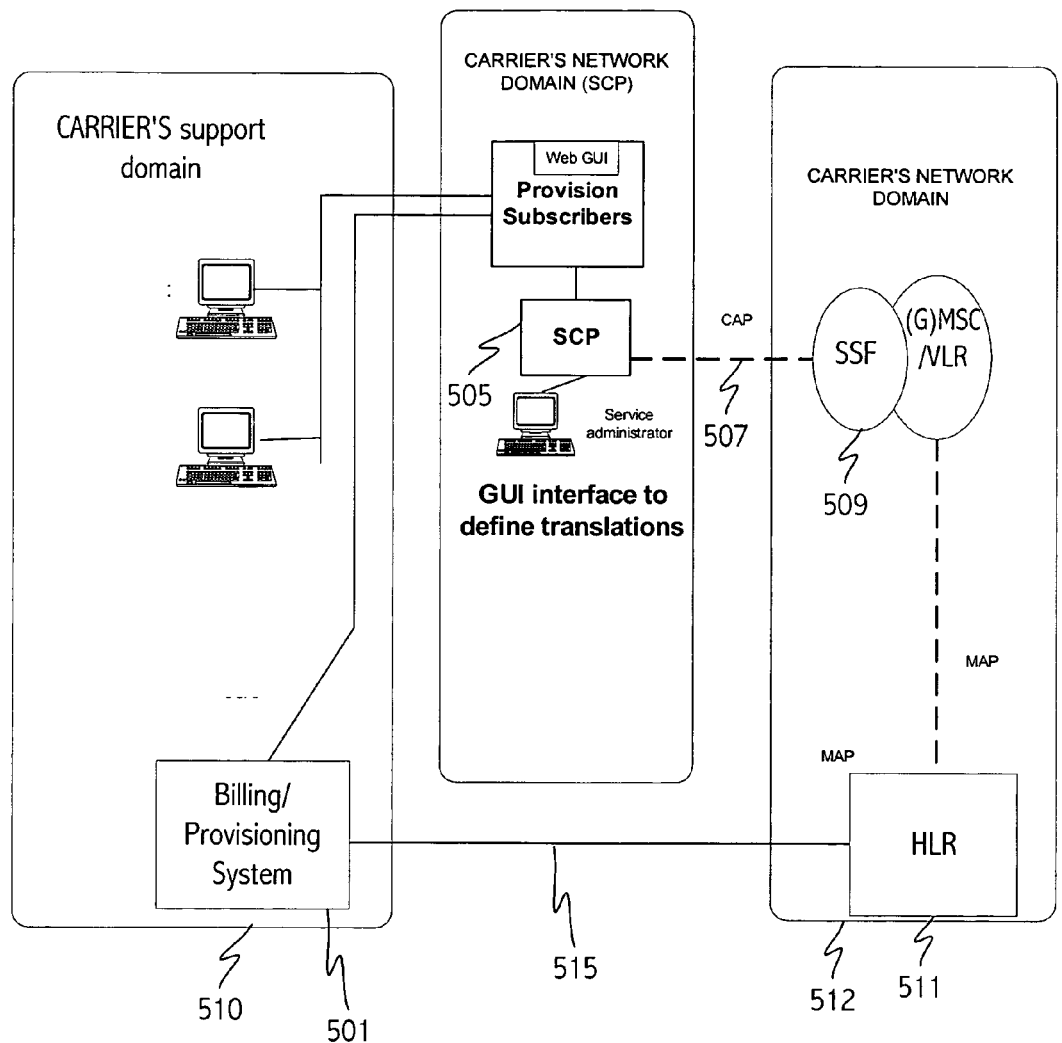
FIG. 5 illustrates a logical embodiment of an exemplary system providing 611 capability according to an embodiment of the invention.

Referring to FIG. 5, illustrated is a logical view showing various domains of a network suitable for implementing one or more embodiments. The billing/provisioning system 501 in the support domain 510 provisions each subscriber with D-CSI (Dialed CAMEL Subscription Information) in the HLR 511 residing in the network domain 512. That ensures that every 611 call from the subscriber will invoke the CAMEL based Customer Care service. The billing/provisioning system 501 assigns a Customer Care Service Key to each subscriber that reflects characteristics about the subscriber (e.g., the subscriber is a reseller subscriber). The Customer Care SCP 505 controls the call processing via CAP dialogue 507 with SSF 509 which is the GSM standard CAMEL functionality that is part of the MSC. The interface between SCP-MSC/VLR/SSF is CAP phase 2. There is a MAP interface between SCP 505 and HLR 511. The interface between SCP-HLR is MAP3. Note that in an embodiment the SCP, MSCs and HLRs are assumed to be CAMEL Phase 3 compliant.

An interface is provided to the SCP application to provision the 611 number translations. The interface can also supply the necessary security to define user groups and access rules for the individual provisioning fields. An interface 515 to the HLR from the billing/provisioning system 501 whenever a subscriber's 611 information is changed or updated.

In another approach to customer care calling that may be used instead of, or in conjunction with, the D-CSI approach described above, Network Dialed Services is utilized in which Network Camel Subscription Information (N-CSI) is defined in the MSCs such that anytime 611 is dialed, the SCP containing the logic for 611 translations is invoked. The N-CSI approach provides the advantage of only having to provision the MSCs with the address of the SCP and the need to trigger on a 611 call. In contrast to the D-CSI approach, there is no need to provide D-CSI information, which includes the SCP address and Service Key, for each subscriber in the HLR. In contrast to prior art approaches, there is no need to provision each MSC with 611 translations.

As described above, conventionally, every MSC maintains a table with all home customer care numbers and associated MCC/MNC information. In response to a 611 call came, the MSC analyzes the call and determines the appropriate home customer care number for the particular call. However, by centralizing the customer care information, and invoking intelligence at the centralized location to determine call routing, the need to provision hundreds of MSCs with customer care routing information is eliminated.

Figure 6:
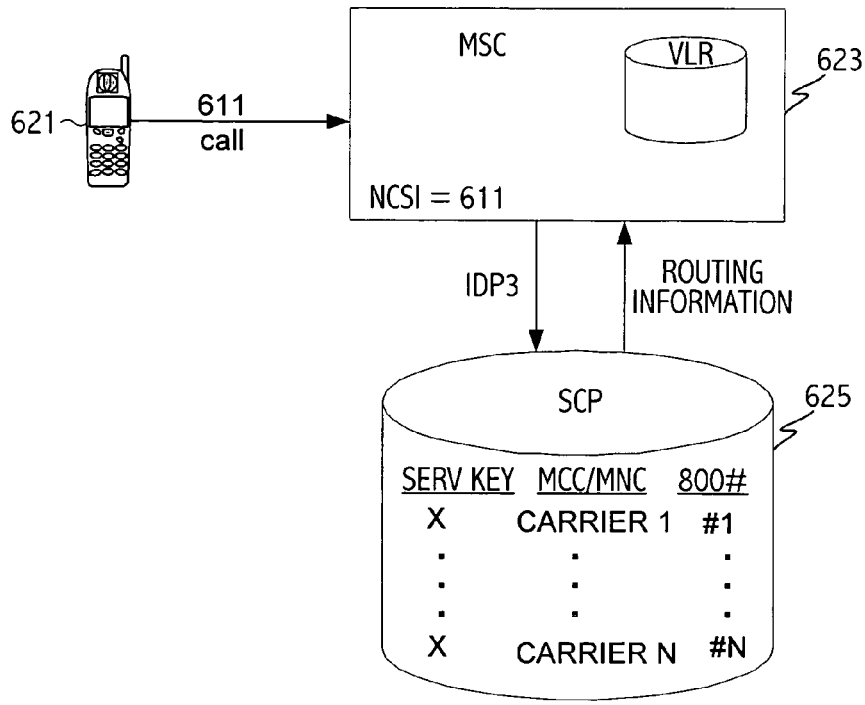
FIG. 6 illustrates an embodiment in which N-CSI information is utilized in customer care calls.

Assume an environment in which a roaming agreement is established that allows one carrier to roam on another carrier's network. In such an environment, according to an embodiment, the home customer care number(s) and the related data that relates MCC/MNC to home customer care number are stored in the SCP. Referring to FIG. 6, assume a subscriber 621 from a second carrier is roaming on a first carrier's network and the subscriber dials 611. Assume the MSC 623 has an N-CSI trigger armed for 611 causing a query to SCP 625 upon detection of a 611 call. Note the trigger is a DP3 trigger relying on analysis of the dialed digits for the triggering mechanism. Once the SCP determines the appropriate customer care number based on, e.g., the MCC/MNC, the call is routed to that carrier's home customer care number. In particular, in one embodiment, when a 611 call is triggered, the SCP analyzes the IMSI and the MCC/MNC in the IMSI is used to determine the home customer care number using a table in the SCP that relates customer care numbers to the MCC/MNC. The SCP returns the customer care number to the MSC for routing the 611 call appropriately. As shown in FIG. 6, an exemplary SCP 625 has a table that for a given service key X has an entry for carriers 1 to N (the carrier being determined according to the MCC/MNC), and the home customer care number associated with that MCC/MNC or carrier. The table may contain, e.g., multiple major carriers and 20 to 30 regional carriers. FIG. 6 illustrates an embodiment in which the customer care number is based on the mobile network code (MCC). The SCP may also utilize additional information, e.g., time of day, day of week, location, NPA-Nxx to determine an appropriate customer care number.

Figure 7:
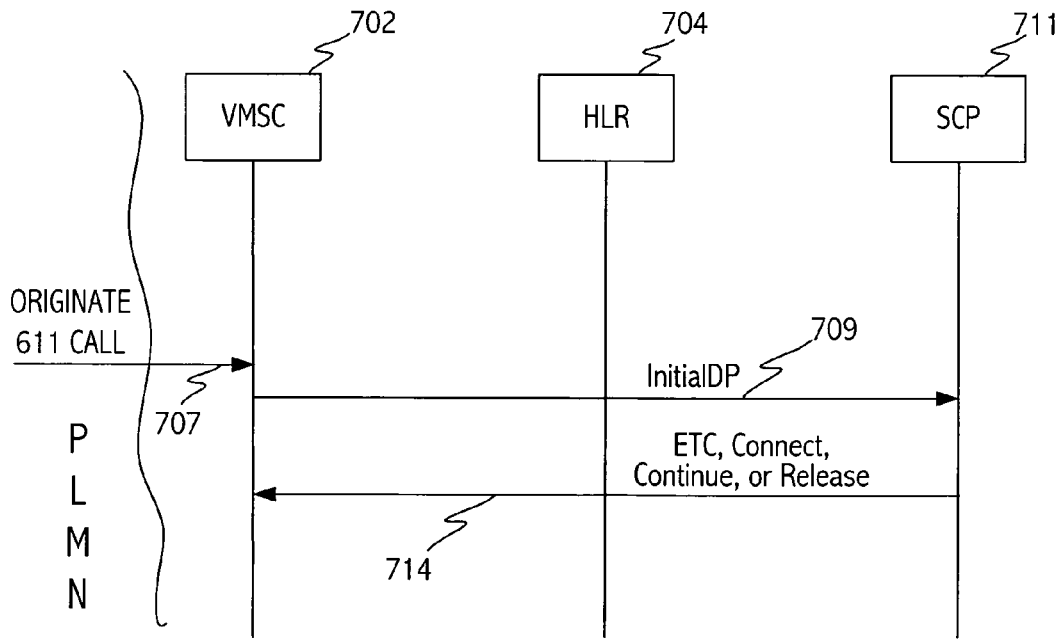
FIG. 7 illustrates a call flow for customer care calls using N-CSI in the MSC to cause a query to the SCP.

Referring to FIG. 7, the call flow for customer care using N-CSI is illustrated. Assume a caller that may or may not be a subscriber from another carrier roaming on the network originates a 611 call at 707. The registration of the mobile communications device with VMSC 702, in response to, e.g., a mobile communications device being turned on, has been omitted to simplify the drawing. Note that the HLR is not needed to return any D-CSI information in contrast to the approach illustrated in FIG. 3. The VMSC 702 already has N-CSI defining an SCP Address and Service Key associated with the DP3 trigger for the dialed string 611. Recognition of the condition (611 string) 'triggers' a query to the external control component (SCP) using the IDP message 709 addressed to the SCP at the SCP Address. Trigger recognition takes place at pre-defined Detection Points (DP) in the call handling. The DP3 trigger, is caused when the dialed digits are analyzed and meet the criteria established for the trigger, here the dialed digits being a 611 call. The SCP 711 analyzes the IMSI associated with the call, determines the appropriate home customer care number and responds at 714 typically with a Connect operation, e.g., for connection to an 800 number or an ETC. Optionally, if the subscriber is roaming from an external carrier, an announcement could be played or in the case there is no translation available for that particular MCC/MNC an announcement could be played or a Release sent to terminate the call or a Continue operation utilized.

Note that the D-CSI approach may be used in conjunction with the N-CSI approach. Assume that the D-CSI trigger takes precedence over the N-CSI trigger. In response to, e.g., a particular subscriber of a carrier dialing 611, the D-CSI trigger would occur and the query would be made to the SCP identified in the D-CSI information associated with the particular subscriber. The SCP would utilize the Service Key identified in the D-CSI information and provided in the IDP message. Thus, the SCP could execute a service particular to a subscriber or group of subscribers. In addition, information such as time of day, location, day of week, etc., could also be used. Utilizing D-CSI information requires the HLR of every subscriber to be provisioned with D-CSI information including the service key and SCP address. If however, a subscriber to another carrier who happens to be roaming in the network makes a 611 call and there is no D-CSI trigger associated with the subscriber, the N-CSI trigger would fire causing the query to be made to the SCP. The SCP in turn determines an appropriate routing for the call based on, e.g., the MCC/MNC within the IMSI. In one respect, the N-CSI trigger provides a default solution to 611 calls, which can be overridden by utilizing the D-CSI trigger event. Thus, utilizing D-CSI triggers, subscribers of resellers could still utilize a 611 customer care number and be directed to an appropriate Customer Care Center for the reseller, while mobile devices subscribing to another network, and lacking D-CSI triggers, could still be directed to their appropriate customer care number using the N-CSI trigger.

While the description herein has been primarily related to 611 calls, the dialed string is not limited to any particular three digits and could apply to any dialed string, e.g., 411, 511 and 711 and to string lengths other than 3.

The following abbreviations and acronyms may be used herein:

| Term | Description |
| --- | --- |
| BCSM | Basic Call State Model |
| CAMEL | Customized Applications for Mobile network Enhanced Logic |
| CAP | CAMEL Application Part |
| CSI | CAMEL Subscription Information |
| D-CSI | Dialed CAMEL Subscription Information |
| DP12 | Detection Point 12 - TerminationAtttemptAuthorized (Terminating Trigger) |
| DP2 | Detection Point 2 - Collected Information (Originating Trigger) |
| DP3 | Detection Point 3 - Dialed |
| GMSC | Gateway Mobile Switching Center |
| GSM | Global System for Mobile communication |
| gsmSCP | GSM Service Control Point |
| gsmSRF | GSM Service Resource Function |
| gsmSSF | GSM Service Switching Function |
| HLR | Home Location Register |
| HPLMN | Home PLMN |
| IMSI | International Mobile Subscriber Identifier |
| IN | Intelligent Network |
| ISUP | ISDN User Part |
| MAP | Mobile Application Part |
| MCC | Mobile Country Code |
| MNC | Mobile Network Code |
| MSC | Mobile Switching Center |
| NAM | Network Access Mode |
| N-CSI | Network CAMEL Subscription Information |
| O-CSI | Originating CAMEL Subscription Information |
| ODB | Operator Determined Barring |
| OTA | Over The Air (activation) |
| PLMN | Public Land Mobile Network |
| SCP | Service Control Point |
| SMSC | Serving Mobile Switching Center |
| T-CSI | Terminating CAMEL Subscription Information |
| VLR | Visited Location Register |

While various aspects of providing a flexible Customer Care solution have been described herein, note that the description of the invention set forth herein is illustrative, and is not intended to limit the scope of the invention as set forth in the following claims. Other variations and modifications of the embodiments disclosed herein may be made based on the description set forth herein, without departing from the scope of the invention as set forth in the following claims.

What is claimed is:

1. A method for use in a mobile communications system comprising:

storing in a storage associated with a switching center an address of an external control component and a service indicator indicating a service to be performed by the external control component;

in response to detecting a customer care call from a mobile communications device in the switching center according to a sequence of dialed digits of the customer care number, suspending call processing and querying the external control component utilizing the address;

at the external control component performing the service indicated by the service indicator and determining how to continue processing the customer care call in accordance therewith; and communicating call control information from the external control component to the switching center regarding how to continue call processing, and wherein the address and the service indicator are associated with the switching center and not the mobile communications device.

2. The method as recited in claim 1 wherein the sequence of dialed digits for the customer care call is 611.

3. The method as recited in claim 1 further comprising the switching center sending the service indicator to the external control component.

4. The method as recited in claim 1 wherein the service performed by the external control component determines a translation for the customer care call and the external control component returns information to the switching center for routing the call according to the translation.

5. The method as recited in claim 4 wherein the translation is determined at least in part according to an International Mobile Subscriber Identifier (IMSI) associated with the mobile communications device.

6. The method as recited in claim 4 wherein the translation is determined at least in part according to one or more of time of day and day of week.

7. The method as recited in claim 1 wherein the service indicator and address of the external control component are Network CAMEL Subscription Information (N-CSI) stored by the switching center.

8. The method as recited in claim 1 further comprising:
the external control component maintaining a storage associating IMSI information with respective customer care numbers;
the external control component translating the customer care number according to, at least in part, the IMSI information; and
returning the translation of the customer care number to the switching center in a connect operation.

9. The method as recited in claim 1 further comprising:
the external control component returning one of an Establish Temporary Connection (ETC) operation, a Continue operation, and a release operation to the switching center as call control information.

10. The method as recited in claim 1 further comprising:
the external control component maintaining a storage associating IMSI information with respective customer care numbers;
the external control component translating the customer care number according to, at least in part, the IMSI information; and
returning the translation of the customer care number to the switching center in a connect operation.

11. The method as recited in claim 1, wherein the customer care call is processed at least partially based on a Dialed CAMEL Subscription Information (D-CSI) trigger event, the processing being at least partially based on the D-CSI trigger event having priority over a Network CAMEL Subscription Information (N-CSI) trigger event.

12. An apparatus comprising:
a service control point (SCP) coupled to receive information from at least one switching center remote to the SCP, the information related to a customer care call from a mobile telecommunications device, the service control point comprising a storage maintaining respective customer care numbers and the service control point being responsive to the received information to determine a translation for the customer care call; and
at least one switching center and wherein the information from the at least one switching center includes a service key indicative of a service to be performed by the SCP, wherein the service control point determines the translation of the customer care call further based on at least one of time of day and day of week.

13. The apparatus as recited in claim 12 wherein the storage maintains a correspondence between respective customer care numbers and IMSI information.

14. The apparatus as recited in claim 12 wherein the service control point is further responsive to supply the translation of the customer care call to the switching center as part of a connect operation.

15. The apparatus as recited in claim 12, wherein the service key is included in Network CAMEL Subscription Information (N-CSI) associated with the switching center.

16. The apparatus as recited in claim 12, wherein the service key is included in Dialed CAMEL Subscription Information (D-CSI) stored by a Home Location Register.

17. The apparatus as recited in claim 12, wherein the customer care call is processed at least partially based on a Dialed CAMEL Subscription Information (D-CSI) trigger event, the processing being at least partially based on the D-CSI trigger event having priority over a Network CAMEL Subscription Information (N-CSI) trigger event.

18. A method for use in a mobile communications system comprising:
invoking a service control point (SCP) having translation capability for customer care calls when a customer care call from a mobile communications device is received by a switching center, wherein a switching center invoking the SCP uses a service key and address of the service control point associated with the switching center without being associated with the mobile communications device,
wherein the service key and address of the service control point are Network CAMEL Subscription Information (N-CSI) stored by the service control point.

19. The method as recited in claim 18 further comprising:
determining a translation for a customer care number in the SCP based, at least in part, on an International Mobile Subscriber Identifier (IMSI) associated with the mobile communications device.

20. The method as recited in claim 19 wherein the SCP determines the translation for the customer care number further based on at least one of time of day and day of week.

* * * * *

UNITED STATES PATENT AND TRADEMARK OFFICE
CERTIFICATE OF CORRECTION

PATENT NO. : 7,463,889 B1 Page 1 of 1
APPLICATION NO. : 11/200743
DATED : December 9, 2008
INVENTOR(S) : Kenneth J. DiPrima et al.

It is certified that error appears in the above-identified patent and that said Letters Patent is hereby corrected as shown below:

On the Title Page, after the Item (*) Notice paragraph, please add --This patent is subject to a terminal disclaimer.--

Signed and Sealed this

Seventeenth Day of March, 2009

JOHN DOLL
*Acting Director of the United States Patent and Trademark Office*